(12) United States Patent
Pincenti et al.

(10) Patent No.: US 8,274,596 B2
(45) Date of Patent: Sep. 25, 2012

(54) METHOD AND APPARATUS FOR MOTION DETECTION IN AUTO-FOCUS APPLICATIONS

(75) Inventors: John Pincenti, Des Plaines, IL (US); Doina Petrescu, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 843 days.

(21) Appl. No.: 12/112,196

(22) Filed: Apr. 30, 2008

(65) Prior Publication Data

US 2009/0273704 A1    Nov. 5, 2009

(51) Int. Cl.
*H04N 5/228* (2006.01)
(52) U.S. Cl. .... 348/349; 348/352; 348/345; 348/208.12
(58) Field of Classification Search .................. None
See application file for complete search history.

(56) References Cited

U.S. PATENT DOCUMENTS

| | | |
|---|---|---|
| 6,222,587 B1 | 4/2001 | Ito et al. |
| 6,362,852 B2 | 3/2002 | Ito |
| 2003/0108334 A1 | 6/2003 | Nevenka et al. |
| 2003/0133034 A1 | 7/2003 | Takahashi |
| 2005/0275742 A1 | 12/2005 | Baron |
| 2006/0066744 A1* | 3/2006 | Stavely et al. ............. 348/352 |
| 2006/0120709 A1 | 6/2006 | Kobayashi |
| 2006/0120710 A1 | 6/2006 | Nagano et al. |
| 2006/0192886 A1 | 8/2006 | Kobayashi |
| 2006/0232697 A1* | 10/2006 | Ito et al. .................. 348/345 |
| 2007/0013777 A1* | 1/2007 | Inoue et al. ............. 348/143 |
| 2008/0031609 A1 | 2/2008 | Rukes |

FOREIGN PATENT DOCUMENTS

KR    10-2008-0028764 A    4/2008

OTHER PUBLICATIONS

Choi, K. et al., "Focus New Autofocusing Technique using the Frequency Selective Weighted Median Filter for Video Cameras", *IEEE Transactions on Consumer Electronics*, vol. 45, No. 3, pp. 820-827, Aug. 1999, (Aug. 1, 2009).

Ooi, K. et al., "An Advanced Autofocus System for Video Camera using Quasi Condition Reasoning", *IEEE Transactions on Consumer Electronics*, vol. 36, No. 3, pp. 526-530, Aug. 1990., (Sep. 1, 1990).

(Continued)

*Primary Examiner* — James Hannett
*Assistant Examiner* — Angel L Garces-Rivera
(74) *Attorney, Agent, or Firm* — Roland K. Bowler, II; Philip H. Burrus, IV (57) ABSTRACT

A method (300) and image capture device (100) are provided for determining whether an image incident upon an image sensor (101) is sufficiently stable prior to executing an auto-focus process. An image stability mechanism (104) compares attribute data—such as luminance or frequency spectrum—from successive images to determine whether a change between the attribute data from image to image is within a predetermined range (710). The image stability mechanism (104) can also be configured to determine whether a scene incident upon the image sensor (101) has changed. Where the image is sufficiently stable, an indicator module (107) provides an image stability indication to a control circuit (102). The control circuit (102) can then be configured to execute the auto-focus operation when the image is sufficiently stable, or when both the scene has changed and the image is sufficiently stable.

17 Claims, 7 Drawing Sheets

OTHER PUBLICATIONS

He, J. et al., "Modified Fast Climbing Search Auto-focus Algorithms with Adaptive Step Size Searching Technique for Digital Camera", *IEEE Transactions on Consumer Electronics*, vol. 49, No. 2, pp. 257-262, (May 1, 2003).

Gamadia, M. et al., "Real-time Implementation of Auto Focus on the TI DSC Processor", *Proceedings of SPIE-IS&T Electronic Imaging (Real-time Imaging VIII)*, vol. 5297, pp. 10-18.

Kehtarnavaz, N. et al., "Development and real-time implementation of a rule-based auto-focus algorithm", *Real-Time Imaging*, vol. 9, pp. 197-203, 2003.

Transport Research Board, of National Academies "Transport Cooperative Research Program, Report 86, Intrusion Detection for Public Transportation Handbook", http://onlinepubs.trb.org/Onlinepubs/tcrp/tcrp_rpt_86v4.pdf.

Kodak, "Kodak Easy Share DX7590 Digital Camera Specifications", http://www.kodak.com/eknec/PageQuerier.jhtml?pg-locale=en_US&pg-path=2798.

Patent Cooperation Treaty, "PCT Search Report and Written Opinion of the International Searching Authority" for International Application No. PCT/US2009/040912 dated Dec. 4, 2009, 10 pages.

* cited by examiner

METHOD AND APPARATUS FOR MOTION DETECTION IN AUTO-FOCUS APPLICATIONS

BACKGROUND

1. Technical Field

This invention relates generally to electronic image capture devices having auto-focus capabilities, and more particularly to an electronic image capture device that includes an image stability mechanism ensuring that an image is sufficiently stable prior to executing the auto-focus operation.

2. Background Art

Image capture devices, such as digital cameras and other similar mechanisms, are becoming more commonplace. Once available only on high-end professional cameras, today such devices are found in mobile telephones, personal digital assistants, and other portable electronic devices. Two of the more popular image capture technologies are complementary metal oxide semiconductor (CMOS) devices and charge-coupled devices (CCDs). These devices include an image sensor that is configured to measure and quantify incident light. They are small and relatively inexpensive to manufacture, and are thus popular accessories in today's portable electronic devices.

The image capture devices available in many portable electronic devices include an auto-focus feature. Auto-focus systems use image-processing circuits to automatically determine the proper focus, thereby eliminating the need for the user to do so. In most portable electronic devices, the image capture device includes a fixed-focus lens. Without auto-focus capabilities, such a lens is capable of rendering acceptable images from about sixty centimeters to infinity. An auto-focus lens can render highly focused images from ten centimeters to infinity.

While the auto-focus feature increases the range within which properly focused images can be captured, one drawback to such auto-focus mechanisms is that they can be relatively slow. For instance, in some image capture systems integrated into portable electronic devices, the auto-focus system must—through intelligent trial and error—move the lens to a particular position that corresponds to a focused image. The auto-focus system does this by examining an image, moving the lens, capturing another image, and examining it again to determine if the proper focus has been achieved. The process is repeated until the optimal lens position is found. This can take as many as fifteen images. In an image capture device having a $1/15^{th}$ second frame rate, the entire auto-focus procedure can take one second.

While this may not seem like a large amount of time, the time can be greatly extended where the image capture device is moving and the auto-focus operation is taking place. For instance, a user's shaky hand or a moving platform can cause the image capture device to move significantly. Such movement can result in blurry images, as the autofocus feature lacks a consistent subject upon which to achieve focus. Further, even where focus is finally achieved, such movement cause the auto-focus operation to take even more time to complete.

There is thus a need for an improved image capture device that helps to reduce inefficiencies in auto-focus operations that occur due to image capture device movement.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to determining suitable stability of image data from an image sensor in an image capture device, and then executing an auto-focus operation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the stability determination of image data as described herein. The non-processor circuits may include, but are not limited to, signal drivers, digital signal processing systems and filters, clock circuits, power source circuits, and user input devices. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method and apparatus that determines whether an image incident on a sensor of an image capture device is sufficiently stable prior to executing the auto-focus operation. Such embodiments offer a way to overcome the excessive time required by prior art auto-focus operations when the image seen by the image sensor is unstable. For example, in one embodiment, the auto-focus operation is executed only after the image seen by the image sensor is sufficiently stable.

In one embodiment, an image stability mechanism provides an image stability indication to a control circuit, thereby informing the control circuit that the image is sufficiently stable for the auto-focus operation to execute efficiently. Some embodiments of the invention employ statistical data taken from the image sensor to make such a determination. Other embodiments of the invention employ output signals from hardware devices, such as gyroscopes or accelerometers, to determine image movement. This information is then used to make intelligent decisions regarding when to execute the auto-focus operation.

Embodiments of the invention may also be used to detect changes in scene of an image or of a region of interest. Methods and apparatuses described herein facilitate execution of the auto-focus operation during times when the image becomes steadier. Illustrating by way of example, consider a photographer focusing upon am image. After focusing or capturing an image, the photographer moves the image capture device toward another subject. Embodiments of the invention can preclude the auto-focus operation from executing until the image stability mechanism detects that the photographer has reached a certain level of stability in relation with the new subject.

Various embodiments of the invention can be configured as executable code suitable for use with a microprocessor or controller of an image capture system. Where so configured, the executable code can include various modules that are used to determine image stability. In one embodiment, a data capture module monitors data taken from the image sensor, such luminance, spatial frequency, color, or other data. The data capture module monitors this data from frame to frame. A comparison module then determines if the data varies greatly from one frame to the next.

Where this is the case, the presumption is that the image is not suitably stable for an image to be captured or for the autofocus operation to complete efficiently. During this time the auto-focus operation would not be performed. In one embodiment, the lens would be moved to a probable focus position during this time. Lens position can be dependent upon statistical information collected from previous images. Alternatively, the probable focus position can be assumed. For instance, a common picture taken by many photographers is a portrait at a distance of two meters. By moving the lens to the most probable position while determining image stability, focus time can be reduced when the auto-focus operation is activated.

Once the comparison module determines that the luminance (or other) data is sufficiently stable, an indicator module provides an image stability indication to the controller. This image stability indication informs the controller that the photographer composing the scene is ready to capture the image, as the image is sufficiently stable. Upon receiving the image stability indication, the controller executes the auto-focus operation.

While embedded firmware and image sensor data analysis is one way to determine image stability, other embodiments of the invention employ hardware devices to approximate image stability by determining device stability. For example, accelerometers or gyroscopes can be used to detect device motion. Once the device is sufficiently stable, the indicator module can presume that the image is stable as well. Thus, the auto-focus operation can be initiated. Such hardware devices can further multi-task by adding functionality to gaming or other applications.

Figure 1:
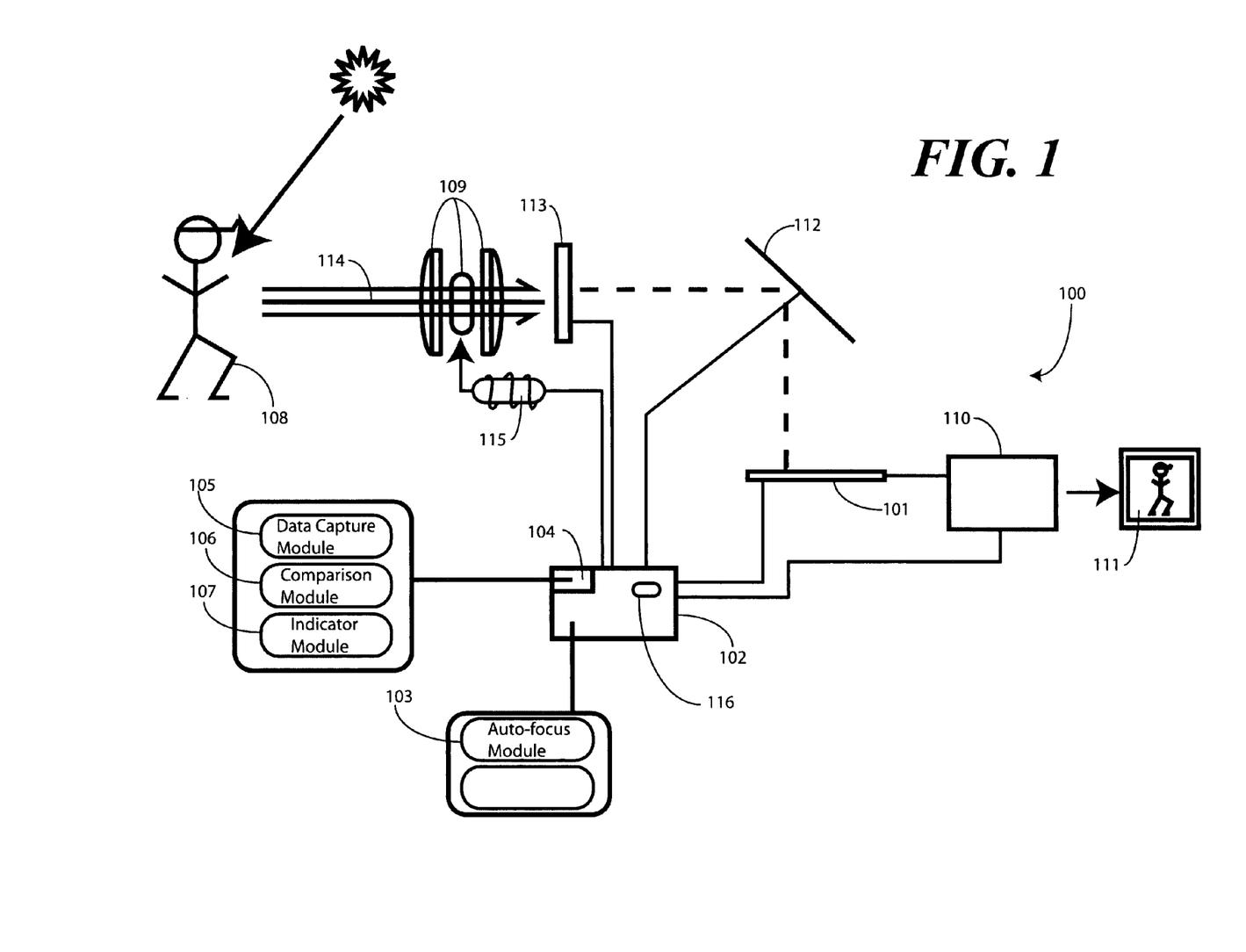
FIG. 1 illustrates one embodiment of an auto-focus image capture device in accordance with the invention.

Turning now to FIG. 1, illustrated therein is one embodiment of an auto-focus image capture device 100 in accordance with the invention. The image capture device 100 includes an image sensor 101 and a control circuit 102. The image sensor 101, which can be any type of image sensor known in the art, including CMOS or CCD sensors, is configured to receive light 114 through a lens 109. The light 114 may be reflected off a subject 108, and comprises an image that the image sensor 101 can capture. The light 114 may be redirected or reflected within the image capture device 100. For instance, a mirror 112 or other object may redirect the light 114 as it passes from lens 109 to image sensor 101. Further, the light 114 may pass through an aperture 113 as well.

The control circuit 102 is coupled to the image sensor 101 and is configured to cause the image sensor 101 to capture electronic image data. The control circuit 102 can comprise a microcontroller, embedded controller, application specific controller, or other suitable device.

The control circuit 102 can perform the various functions of the image capture device 100 by executing instructions in the form of software code, which may be stored in an associated memory (not shown). Further, each of the modules that will be described herein can be embodied in the form of executable software or firmware code.

An auto-focus module 103 performs the auto-focus operation. The auto-focus operation, known in the art, can involve moving the lens 109 closer to, or farther away from, the image sensor 101 to achieve a proper focus of the subject 108 on the image sensor 101. In one embodiment, the auto-focus module 103 receives image information from a post-processing module 110 to determine whether the image incident upon the image sensor 101 is in focus. The auto-focus module 103 can then cause a small motor 115 or other electromechanical device to move the lens 109 in or out until the sharpest possible image of the subject 108 is projected upon the image sensor 101. While the illustrative embodiment of FIG. 1 is that of an active auto-focus system, note that passive auto-focus systems, or combinations of active and passive systems, may also be employed.

As noted above, when the image being projected upon the image sensor 101 is moving, perhaps due to movement of the image capture device 100 or due to movement of the subject 108, the auto-focus module 103 will have a difficult time achieving the proper focus. This is because in many image capture systems, the image capture device is "scanned" or "swept", meaning that the various sensors in the image sensor 101 are read sequentially. When the image is changing, the movement causes blur in scanning-type image sensors.

Embodiments of the present invention work to reduce the problem of trying to automatically focus on a moving image by using an image stability mechanism 104. The image stability mechanism 104, which in one embodiment is configured as executable software code suitable for operation with the control circuit 102, is configured to provide an image stability indication to the control circuit 102. The image stability mechanism 104 provides such a signal when the image is sufficiently stable that the auto-focus module 103 will be able to efficiently execute the auto-focus operation. Said differently, once the image stability mechanism 104 determines that the image incident upon the image sensor 101 is sufficiently stable that the auto-focus module 103 will be able to render an in-focus image 111, the image stability mechanism 104 provides the image stability indication to the control circuit 102 so that the control circuit 102 can efficiently execute the auto-focus operation.

In one embodiment, the control circuit 102 is configured to actuate the auto-focus module 103 only after receiving the image stability indication from the image stability mechanism 104.

While user controls can be included to override such a setting, where the control circuit 102 is so configured, it executes the auto-focus operation by actuating the auto-focus module 103 only when the image incident upon the image sensor 101 becomes sufficiently stable.

The image stability mechanism 104 can determine whether the image is sufficiently stable in any of a variety of ways. Several examples will be set forth herein, although it will be obvious to one of ordinary skill in the art having the benefit of this disclosure that other equivalent methods may also be used. In one embodiment, the image stability mechanism 104 uses luminance data received by the image sensor 101 to determine whether the image incident upon the image sensor 101 is sufficiently stable. In another embodiment, the image stability mechanism 104 uses frequency spectrum information of the image to determine whether it is sufficiently stable. In another embodiment, the image stability mechanism 104 uses an image characteristic, such as color, to determine whether the image is sufficiently stable. Alternatively, hardware devices may be used, including gyroscopes and accelerometers.

In one embodiment, the image stability mechanism 104 comprises multiple modules. For example, the image stability mechanism 104 can comprise a data capture module 105, a comparison module 106, and an indication module 107. Each of these modules may be configured as code executable by the control circuit 102 and stored in memory. These modules can carry out certain processes of the methods described below. While the modules can be implemented in software, they can also be implemented in hardware, which can facilitate the operation of the overall image capture device 100. The modules may be installed at the factory or can be installed after distribution by, for example, a downloading operation.

The data capture module 105, which may be a component in the image capture device's normal operation, is configured to initiate scanning sweeps of the image sensor 101. For example, the data capture module 105 may be configured to sweep the image sensor 101 fifteen times a second, with a certain number of sweeps being stored in memory, or being delivered to the post processing circuit 110 for digital analysis. From these sweeps, the data capture module 105 obtains sets of digital values corresponding to a predetermined characteristic of light incident upon the image sensor 101. One exemplary characteristic is the luminous intensity of the image. Another characteristic is the spatial frequency of the image.

This data is obtained from at least two sweeps of the image sensor 101 so that the characteristic of successive images can be compared to one another. Once the data is obtained, the comparison module 106 then compares this characteristic data from one scanning sweep to another scanning sweep for consistency. By way of example, where the predetermined characteristic is luminance, and the luminous intensity detected by each sensor in the image sensor 101 is sufficiently consistent from image to image, the image stability mechanism 104 can predict that the image incident upon the image sensor 101 is sufficiently stable.

Where the comparison module 106 determines that the predetermined characteristic is sufficiently consistent from sweep to sweep, the indicator module 107 provides the image stability indication to the control circuit 102. This image stability indication, in one embodiment, is delivered when the change in the predetermined characteristic, as represented by the digital values obtained by the data capture module 105, are within a range that is indicative of a sufficiently stable image. One example of the predetermined range for luminance may be luminance values within plus or minus five percent of the total luminance range across, for example, ten percent of the image or across the region of interest. Note that the region of interest may be set automatically by the image capture device 100, or may be manually set by the user.

In another embodiment, rather than using luminance data, the data capture module 105 captures spatial frequency spectrum data from sweep to sweep, or image to image. As with luminance data, the data capture module 105 can capture spatial frequency spectrum data across the image as a whole or in only a region of interest. Also as with luminance data, the comparison module 106 can compare the spatial frequency spectrum data from image to image to determine whether it is sufficiently consistent. Where it is, the indicator module 107 provides the image stability indication, as the change in spatial frequency spectrum from image to image is within a range indicative of image stability.

In one embodiment, the comparison module 106 uses digital signal processing techniques in determining whether the spatial frequency spectrum data is within the predetermined range. For example, the comparison module 106 can compare a first attribute data set of spatial frequency spectrum data taken from a first image to a second attribute data set of spatial frequency spectrum data taken from a second image by processing the respective data sets with a digital filter, such as a high pass or band pass filter. The comparison module 106 can examine the output of such a filter to determine whether the image is substantially stable. By way of example, in one embodiment the comparison module 106 processes the attribute data with a fourth order band pass filter having a lower cutoff frequency of between thirty and forty percent of the image sensor Nyquist frequency, and an upper cutoff frequency of between sixty and seventy percent of the image sensor Nyquist frequency.

While the image stability mechanism 104 can comprise modules of executable code, it is also possible to configure suitable image stability mechanisms in hardware. In one embodiment, the image stability mechanism 104 comprises an accelerometer. When the image capture device 100 is moving, the motion can be detected by the accelerometer. As such, the control circuit 102 can preclude the auto-focus operation from executing until the image capture device 100 becomes stable.

In another embodiment, the image stability mechanism 104 can comprise a gyroscope. As is known in the art, gyroscopes can be used to detect motion. As such, the control circuit 102 can preclude the auto-focus operation from executing until the image capture device 100 becomes stable.

Note that there are some instances where occasionally focusing the lens 109 can be productive—even where the image capture device is moving. For example, where a photographer is composing different scenes, from time to time an auto-focus operation is warranted regardless of image stability. To provide for such operation, in one embodiment the image capture device 100 includes a timer 116. The timer 116, which is operable with the control circuit 102, can be configured to cause the control circuit 102 to execute an auto-focus operation periodically. For example, the timer 116 can be configured to reset and run for a predetermined period, such as two or three seconds. Upon expiration of the timer, the control circuit 102 can be configured to actuate the auto-focus module 103 to ensure that the lens 109 stays in a relatively focused position as the image capture device 100 moves from scene to scene.

Further, the image stability mechanism 104 can be configured to detect changes in scene as well. In addition to detecting image stability, in one embodiment the image stability mechanism 104 is also configured to detect changes in scene to ensure that the image capture device remains focused. In such an embodiment, the control circuit 102 can be configured to execute the auto-focus operation where both the scene has changed and the image is sufficiently stable.

Where the image stability mechanism 104 is configured to detect changes in scene, the data capture module 105 is used to gather data from multiple images or scanning sweeps of the image sensor 101. As with image stability, the data capture module 105 initiates multiple scanning sweeps of the image sensor 101 to obtain sets of digital values corresponding to incident light upon the image sensor 101. These digital values can correspond to luminance, spatial frequency spectrum, color, or other image characteristics.

The comparison module 106 is then configured to determine a change in scene values from the digital values. The scene values may differ from the values used to determine image stability. For example, the scene values may be an average luminance of a predetermined number of pixels, a region of interest, or of the overall image. Similarly, significant changes in color for select groups of pixels may also constitute a scene value change.

Once the comparison module 106 determines that a change in scene value has occurred, the indicator module 107 is configured to provide a scene change indication to the control circuit 102. The scene change indication is delivered when the change in scene values from image to image indicates that an image scene has changed from one scanning sweep of the image sensor 101 to the next. Upon receiving the scene change indication, the control circuit 102 may execute the auto-focus operation. Alternatively, the control circuit 102 may be configured to wait for both a scene change indication and an image stability indication prior to executing the auto-focus operation.

Where the scene change feature is employed, the image capture device 100 can be configured to execute the auto-focus operation where both the scene has changed and where the image is stable. As such, a photographer panning from one scene to the next, and settling stably upon the second scene, would only have the auto-focus operation execute once the image capture device 100 had settled on the second scene. This operation of the auto-focus module 103 can lead to quicker times between shots, as the auto-focus module 103 is not continually running. Further, overall power consumption in the image capture device can be reduced for the same reason.

Figure 2:
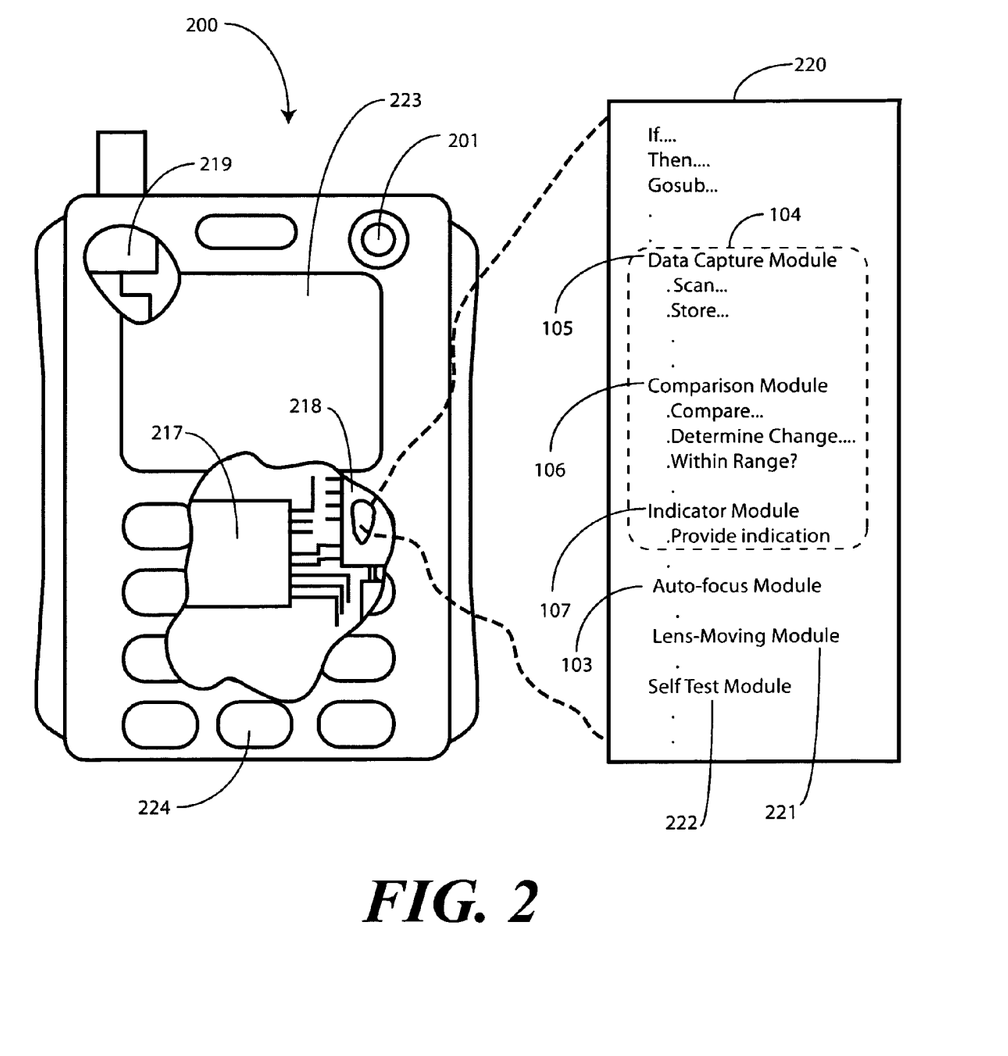
FIG. 2 illustrates one embodiment of a portable electronic device having an image capture device with auto-focus capabilities in accordance with the invention.

Turning now to FIG. 2, illustrated therein is an exemplary portable electronic device 200 having an image capture system in accordance with embodiments of the invention. For simplicity of discussion, the exemplary portable electronic device 200 of FIG. 2 is that of a mobile communication device configured as a cellular telephone. It will be obvious to one of ordinary skill in the art having the benefit of this disclosure that the portable electronic device 200 could be any of a wide variety of devices that have been developed for use within various networks. Such devices include, for example, messaging devices, personal digital assistants (PDAs), notebook or laptop computers incorporating communication modems, mobile data terminals, application specific gaming devices, video gaming devices incorporating wireless modems, and the like.

The portable electronic device 200 is equipped with an image capture device 201 having auto-focus capabilities. While one image capture device 201 is shown, note that any number of image capture devices could be disposed on either side of the portable electronic device 200. The portable electronic device 200 also includes a display device 223 and a keypad 224. The keypad 224, for example, can include navigation components and image capture device control components such as an image capture control or an auto-focus initiation button.

The portable electronic device 200 can include standard components such as a central controller 217, memory 218, and a transceiver 219. Where the image capture device 201 is configured similar to the image capture device (100) of FIG. 1, the portable electronic device 200 can further include the various modules 220 used to operate the image capture device 201. The modules 220 can include an image stability mechanism 104 comprising the data capture module 105, the comparison module 106, and the indication module 107. Other modules can include, the auto-focus module 103, a lens-moving module 221, and an optional self-test or diagnostic module 222. As with FIG. 1, the modules 220 can carry out certain processes of the methods as described herein. The modules 220 can be implemented in software, such as in the form of one or more sets of prestored instructions, or in hardware, which can also facilitate the operation of the portable electronic device 200. The modules may be installed at the factory or can be installed after distribution by, for example, a downloading operation.

The control circuit 102, for carrying out the operations of the image capture system 201, is also provided. Note that the control circuit 102 can be an independent device working in tandem with the controller 217. Alternatively, the control circuit 102 can be integrated with the controller 217.

The control circuit 102 is coupled to the image capture device 201 and is configured to selectively cause the image capture device 201 to execute an auto-focus operation or to capture images. To ensure that the auto-focus module 103 runs efficiently, the image stability mechanism 104 is configured to provide an image stability indication to the control circuit 102 as described above. Once the control circuit 102 receives the image stability indication from the image stability mechanism 104, the control circuit 102 can actuate the auto-focus module 103, thereby executing the auto-focus option.

As with the image capture device (100) of FIG. 1, the image capture device 201 can also be configured with scene change capability. In such a scenario, the image stability mechanism 104 can be configured to deliver a scene change indication when it detects a change in scene. As with the discussion of FIG. 1, the comparison module 106 can compare scene change data from image to image to determine a change in scene values from the digital data analyzed. Once the comparison module 106 determines that a change in scene value has occurred, the indicator module 107 delivers a scene change indication to the control circuit 102. Upon receiving the scene change indication, the control circuit 102 may execute the auto-focus operation. Alternatively, the control circuit 102 may be configured to wait for both a scene change indication and an image stability indication prior to executing the auto-focus operation.

Figure 3:
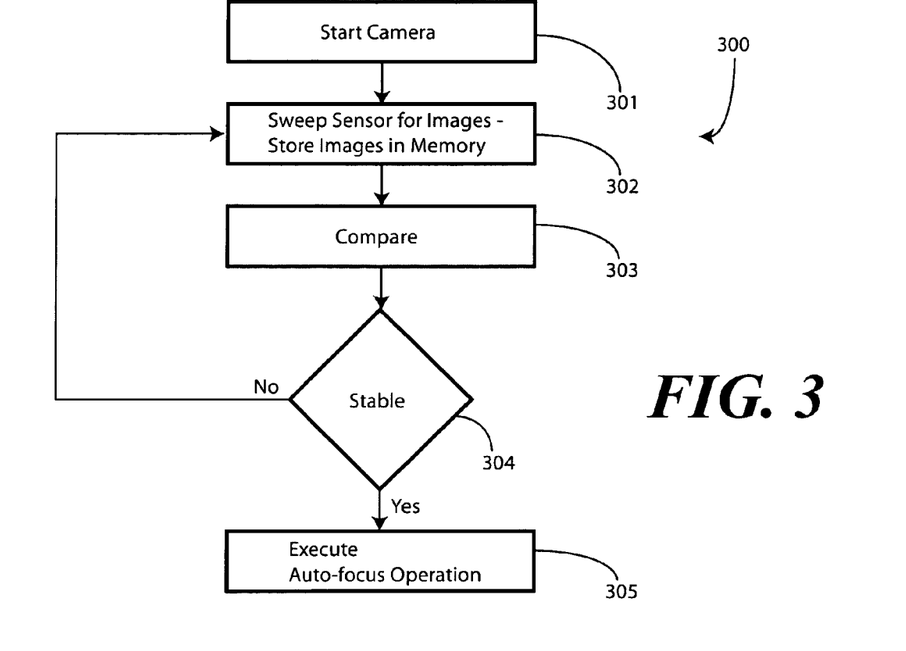
FIG. 3 illustrates one embodiment of a method of performing an auto-focus operation in an image capture device in accordance with embodiments of the invention.

Turning now to FIG. 3, illustrated therein is one method 300 of performing an auto-focus operation in an image capture device in accordance with embodiments of the invention. The method 300 is suitable for coding as executable software for use in an image capture device with a control circuit (102).

At step 301, the image capture device is actuated. In many image capture devices, this begins a continual image sensor sweep process in which data from a plurality of sweeps is stored in memory. In other image capture devices, the image sensor may be selectively swept. This capture of image data corresponding to two or more images is shown in FIG. 3 at step 302.

At step 303, a first attribute data set from a first image is compared with a second attribute data set from a second image. Note that attribute data from multiple images may be compared or averaged as well. As set forth above, this attribute data is data corresponding to a selected characteristic of each image. In one embodiment, the attribute data is luminance data. In another it is spatial frequency spectrum data, and so forth. This data can be taken from the overall image, portions of the image, or from a range of interest within the image. A comparison is made at decision 304 to determine whether a change between the first attribute data set and the second attribute data set is within a predetermined range that is indicative of the image being substantially stable.

Where the change in attribute data sets is within the predetermined range, this implies that an image incident upon the image sensor is sufficiently stable for the auto-focus operation to function efficiently. As such, once this determination is made, the auto-focus operation is executed at step 305.

Thus, to summarize the method of FIG. 3, the scene luminance (or other measurable criteria) of each frame, perhaps when the image capture device is in the viewfinder mode, is measured at step 302. The luminance is then compared from frame to frame at step 303. If, at decision 304, the luminance varies greatly from frame to frame, this indicates the user is not relatively stable and thus not composing a scene. As such, the auto-focus operation does not run. Where, however, the luminance does not vary from one frame to the next, this indicates the user is relatively stable and most likely in the process of composing a scene. As such, the auto-focus operation executes at step 305.

Figure 4:
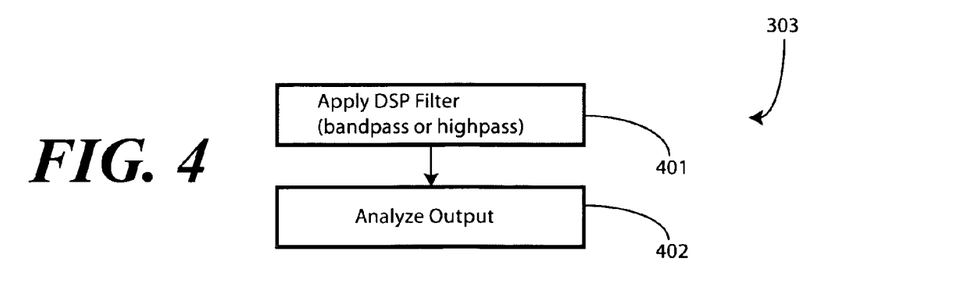
FIG. 4 illustrates one embodiment of a method for comparing successive images to determine whether image data is sufficiently stable in accordance with embodiments of the invention.

As mentioned above, the step of comparing 303 can be carried out using digital signal processing techniques. Turning now to FIG. 4, illustrated therein is one example of the comparison step 303 being carried out using such techniques. For discussion purposes, consider the attribute data set taken from successive images to be either average spatial frequency spectrum data or range of interest spatial frequency spectrum data. At step 401, the data is processed with a digital signal filter. In one embodiment, this digital signal filter comprises a bandpass filter, and the first attribute data set and second attribute data set are passed through the bandpass filter. At step 402, the output of the bandpass filter is analyzed to determine whether the image data is substantially stable.

Figure 5:
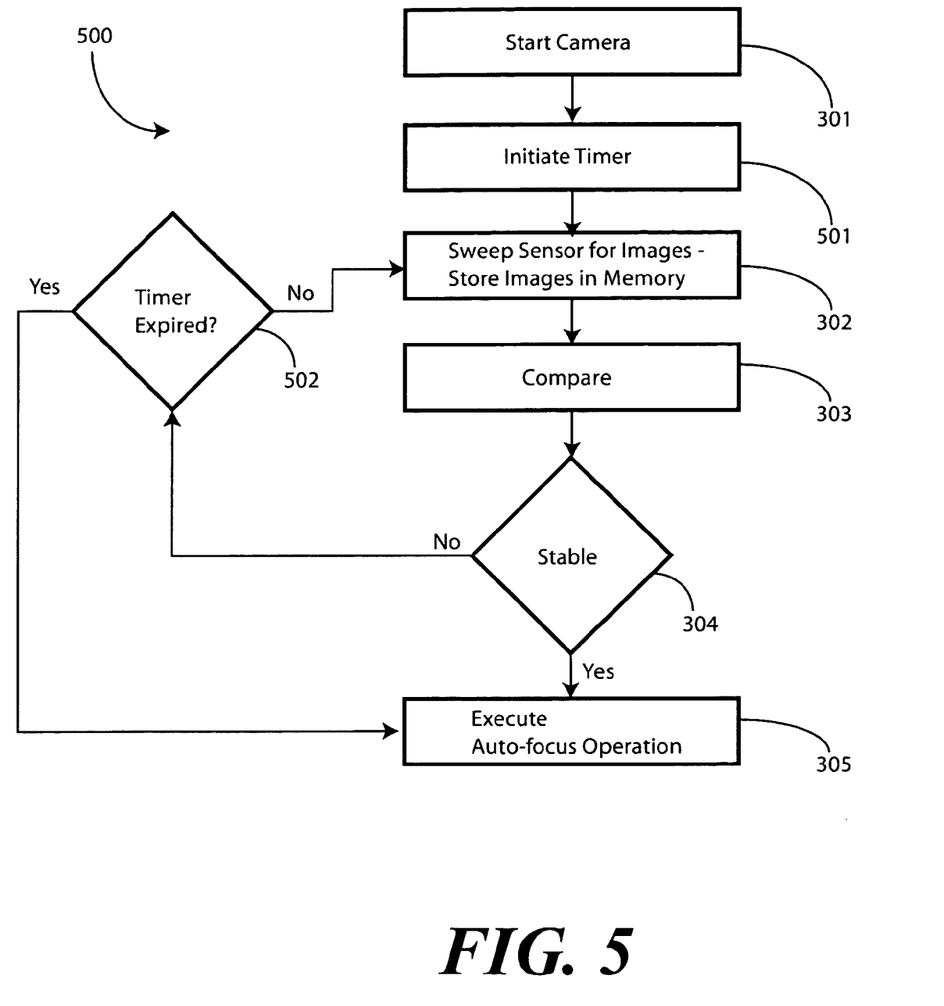
FIG. 5 illustrates another embodiment of a method of performing an auto-focus operation in an image capture device in accordance with embodiments of the invention.

Turning now to FIG. 5, illustrated therein is a method 500 of performing an auto-focus operation in accordance with another embodiment of the invention. The method 500 of FIG. 5 is similar to the method of FIG. 3 in that the step 301 of actuating the image capture device, the step 302 of collecting attribute data from a plurality of successive images, the step 303 of comparing the attribute data, the decision 304 of determining whether the image is stable, and the step 305 of executing the auto-focus operation are all included. The method 500 of FIG. 5 differs from that of FIG. 3 in that it includes the use of the timer, as set forth above, to periodically cause an auto-focus operation to occur regardless of image stability. Note that methods as described herein may also be configured with manual override options that allow a user to execute an auto-focus operation upon request as well.

Specifically, at step 501, a timer is initiated. Exemplary timer durations are from one second to five, ten, thirty, or more seconds. This timer runs while the attribute data is collected at step 302, and while it is compared to determine stability at step 303 and decision 304. If stability is detected prior to expiration of the timer, the auto-focus operation is executed at step 305.

Where, however, image stability is not detected, the auto-focus operation is still executed upon expiration of the timer as determined at decision 502. Said differently, upon expiration of the timer, the auto-focus operation is executed regardless of whether the change between the first attribute data set from a first image and the second attribute data set from a second image is within a range indicative of stability. The timer, where used, ensures that excessive amounts of time do not pass between successive auto-focus operations.

Figure 6:
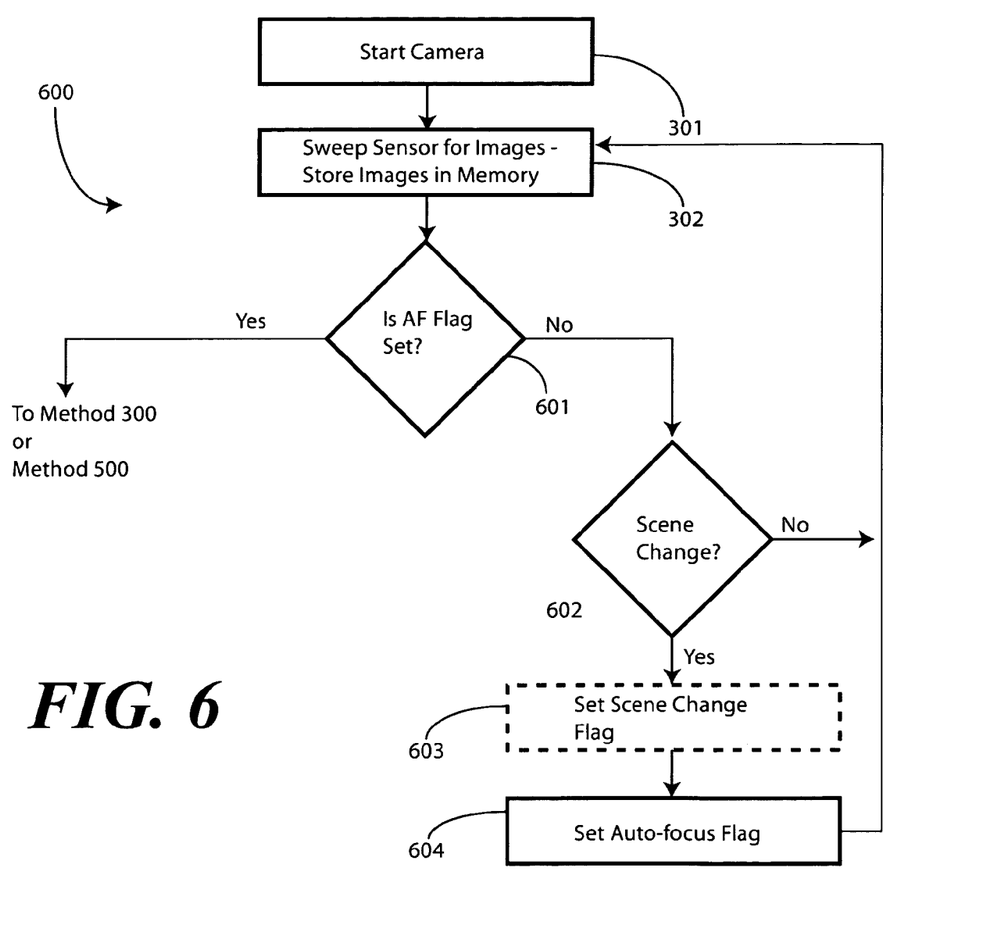
FIG. 6 illustrates another embodiment of a method of performing an auto-focus operation in an image capture device in accordance with embodiments of the invention.

Turning now to FIG. 6, illustrated therein is one method 600 for executing an auto-focus operation when both a scene incident upon an image sensor has changed and that scene has become stable in accordance with embodiments of the invention. The method 600 of FIG. 6 employs a scene change flag to indicate a change in scene, such as would be the case when a photographer points an image capture device at a new subject to compose a new image.

At step 301, the image capture device is actuated. At step 302, a plurality of images are taken with attribute or characteristic data being selected therefrom and stored in memory.

At decision 601, the method 600 checks to see whether the auto-focus flag is set. In one embodiment, the method 600 of FIG. 6 only executes the auto-focus operation when both the auto-focus flag is set and the scene is stable. Presuming for the moment that the auto-focus flag is not set, the method 600 determines whether a scene has changed at decision 602. In one embodiment, this decision is made by comparing a first scene data set with a second scene data set, each of the scene data sets comprising luminous information or other characteristic information selected from the images gathered at step 302. This comparison is to determine whether the change between the first scene data set and the second scene change data set is outside a predetermined scene change range. One example of such a scene change range is a five percent change in average scene luminance.

Where there has been no scene change, the process repeats. However, where a scene change is detected at decision 602, an optional scene change flag can be set at step 603. This scene change flag alerts control circuitry that there has been a change in the image scene incident upon the image sensor or image capture device.

At step 604, since a scene change has been detected, the auto-focus flag is set at step 604. The method then returns to decision 601. Since the auto-focus flag is now set, the method 600 can proceed to either method 300 or 500, or an equivalent method, depending upon whether the optional timer is used. In this scenario, the step (305) of executing the auto-focus operation occurs when the change (detected at decision 304) between the first attribute data set and the second attribute data set is within the predetermined range indicative of image stability and the auto-focus flag is set.

Figure 7:
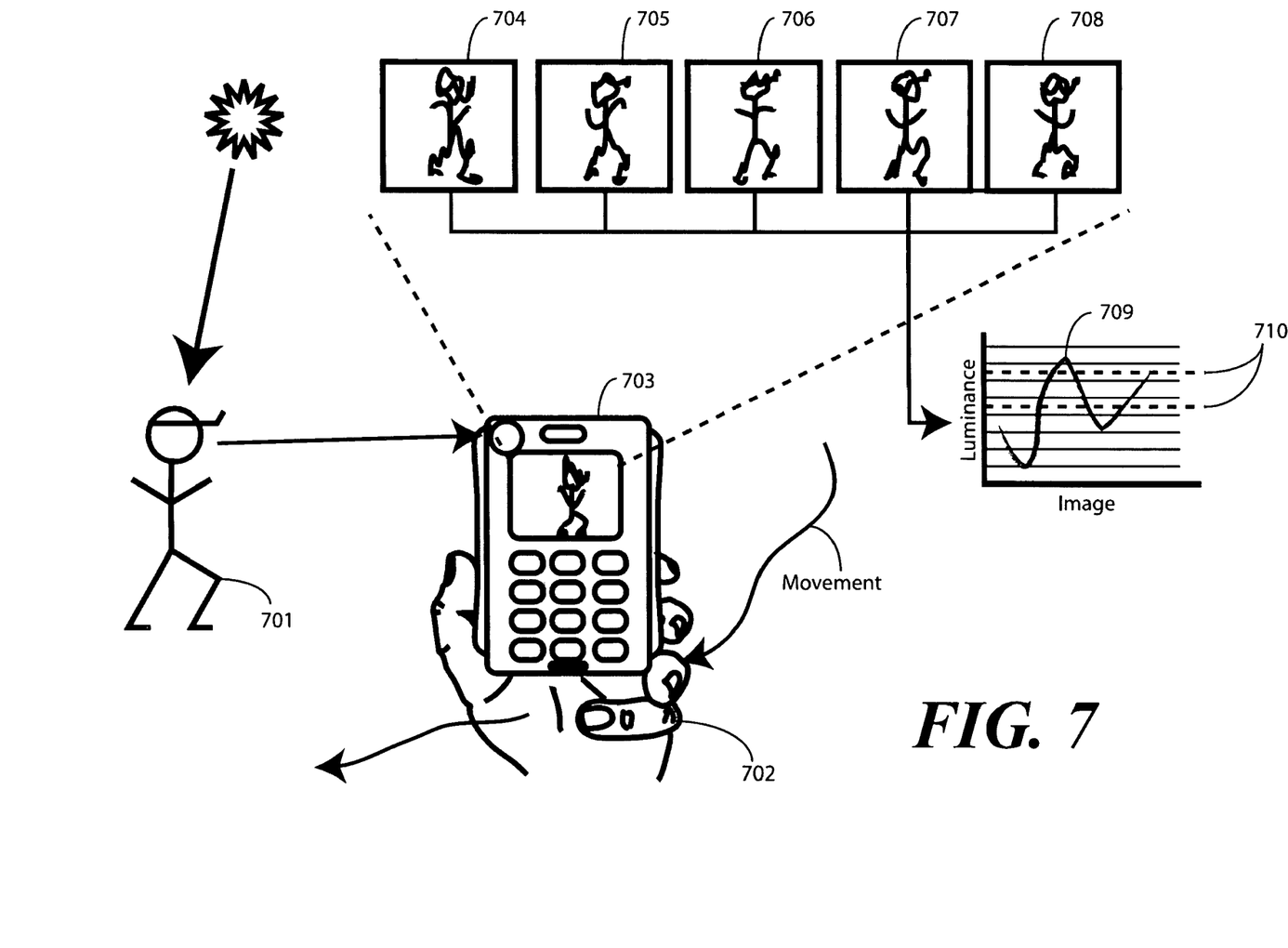
FIG. 7 is an animation diagram illustrating one exemplary determination that image data is not insufficiently stable in accordance with embodiments of the invention.

Turning now to FIG. 7, illustrated therein is an animation diagram illustrating embodiments of the image stability mechanism (104) in operation. In FIG. 7, images 704, 705, 706, 707, 708 represent various sweeps of an image sensor disposed within the portable electronic device 703 having an image capture system in accordance with embodiments of the invention disposed therein. Each of these images 704, 705, 706, 707, 708 is slightly different because the photographer 702 has the portable electronic device 703 in motion relative to his subject 701.

This movement is causing a chart of the attribute data 709—luminance in this example—to vary wildly from frame to frame. As such, the attribute data 709 from image to image is outside of the predetermined range 710. The image is thus not sufficiently stable, and the auto-focus operation is precluded.

Figure 8:
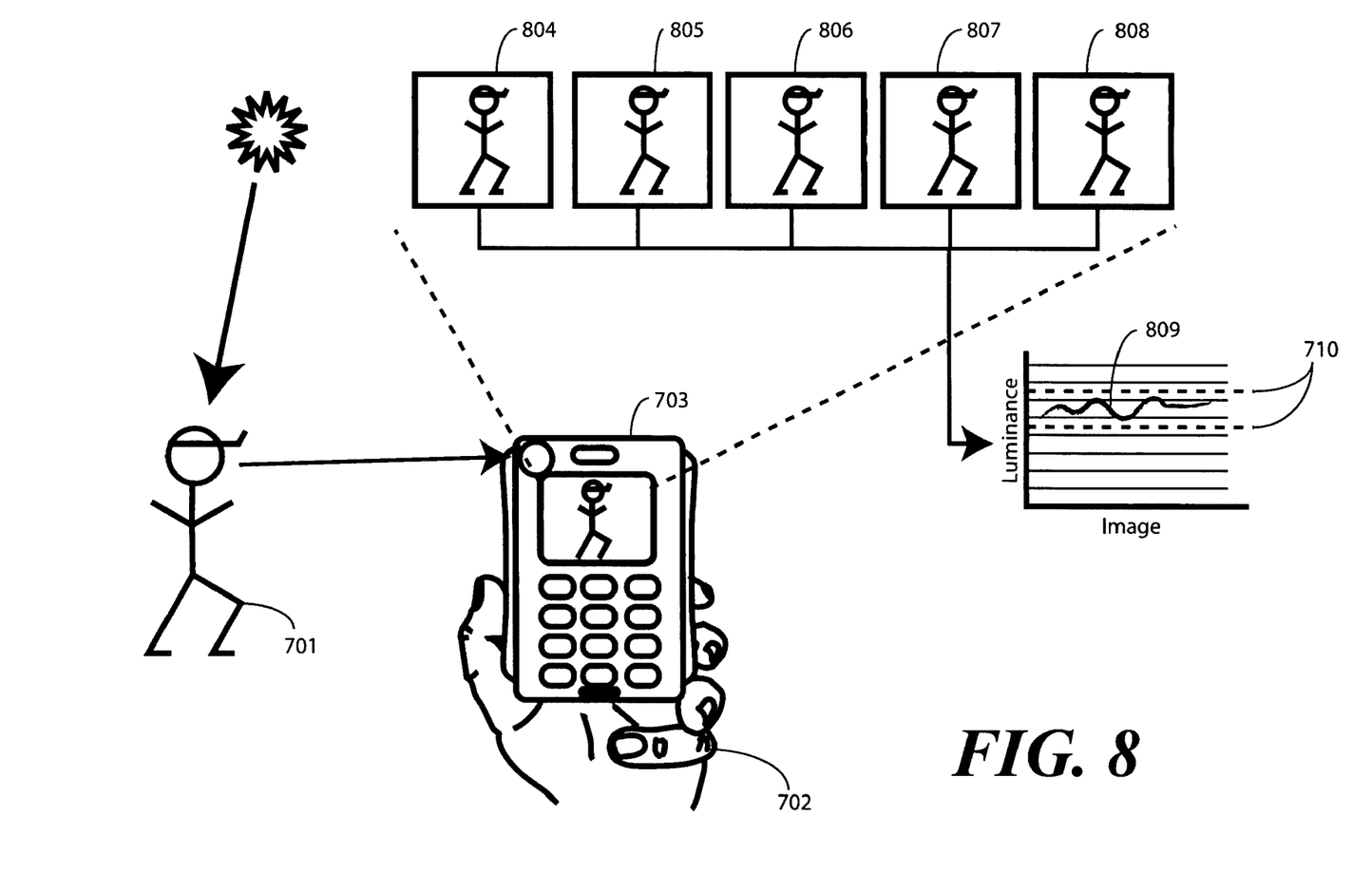
FIG. 8 is an animation diagram illustrating one exemplary determination that image data is sufficiently stable in accordance with embodiments of the invention.

Contrast this with FIG. 8. Illustrated in FIG. 8 is an animation diagram illustrating embodiments of the image stability mechanism (104) in operation when the image is stable. As shown, the images 804, 805, 806, 807, 808 are consistent, as the photographer 702 is now maintaining the portable electronic device 703 with the image capture system relatively stable with respect to the subject 701. As such, the attribute data 809 is within the predetermined range 710. This is indicative of the image data being substantially stable. As such, the auto-focus operation can proceed.

Embodiments of the present invention are suitable for us with any electronic device having an image capture device with auto-focus capability. As some auto-focus devices employ spectral frequency content in their auto-focus algorithms, some embodiments of the invention require little or no modification to existing hardware platforms. The image stability mechanism can be incorporated with minor modifications to the firmware. Embodiments of the present invention work to reduce the amount of time during which the auto-focus module is active, thereby reducing overall power consumption and enhancing battery life.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of performing an auto-focus operation in an image capture device, the method comprising:
    capturing image data corresponding to two or more electronic images;
    comparing a first attribute data set corresponding to at least a first of the two or more electronic images with a second attribute data set corresponding to at least a second of the two or more electronic images to determine whether a change between the first attribute data set and the second attribute data set is within a predetermined range, the predetermined range being indicative of the image data being substantially stable; and
    where the change between the first attribute data set and the second attribute data set is within the predetermined range, executing the auto-focus operation;
    wherein the first attribute data set and the second attribute data set each comprise at least one of:
        an average scene spatial frequency spectrum data;
        a range of interest spatial frequency spectrum data; or
        color data selected from the two or more electronic images.

2. The method of claim 1, wherein the first attribute data set and the second attribute data set each comprise one of an average scene luminance data or a range of interest luminance data.

3. The method of claim 1, wherein the comparing the first attribute data set with the second attribute data set comprises processing both the first attribute data set and the second attribute data set with a digital signal filter and analyzing an output of the digital signal filter to determine whether the image data is substantially stable.

4. The method of claim 3, wherein the digital signal filter comprises one of a high pass filter or a band pass filter.

5. The method of claim 1, further comprising determining whether an image scene incident upon the image capture device has changed.

6. The method of claim 1, wherein the determining whether the image scene incident upon the image capture device has changed comprises comparing a first scene data set with a second scene data set to determine whether the change between the first scene data set and the second scene data set is outside a predetermined scene change range.

7. The method of claim 6, further comprising setting an auto-focus flag, wherein the executing the auto-focus operation occurs when the change between the first attribute data set and the second attribute data set is within the predetermined range and the auto-focus flag is set.

8. The method of claim 1, further comprising initiating a timer and, upon expiration of the timer, executing the auto-focus operation regardless of whether the change between the first attribute data set and the second attribute data set is within the predetermined range.

9. An auto-focus image capture device, comprising:
    an image sensor;
    a control circuit coupled to the image sensor configured to cause the image sensor to capture electronic image data;
    an auto-focus module, operable with the control circuit, and configured to execute an auto-focus operation such that images captured by the image sensor are substantially in focus;
    a data capture module configured to initiate multiple scanning sweeps of the image sensor to obtain sets of digital values corresponding to a predetermined characteristic of incident light upon the image sensor;
    a comparison module configured to determine a change in the sets of digital values from one scanning sweep to another scanning sweep; and
    an image stability mechanism, operable with the control circuit, and configured to provide an image stability indication to the control circuit, and comprising an indicator module configured to provide the image stability indication to the control circuit when the change in the sets of digital values is within a range indicative of image stability;

wherein the control circuit is configured to actuate the auto-focus module upon receiving the image stability indication from the image stability mechanism.

10. The auto-focus image capture device of claim 9, wherein the image stability mechanism comprises a gyroscope.

11. The auto-focus image capture device of claim 9, wherein the image stability mechanism comprises an accelerometer.

12. The auto-focus image capture device of claim 9, wherein the sets of digital values further comprise image luminance data.

13. The auto-focus image capture device of claim 9, wherein the sets of digital values comprise image spatial frequency data.

14. The auto-focus image capture device of claim 9, further comprising a timer, operable with the control circuit, wherein the control circuit is configured to actuate the auto-focus module upon expiration of the timer.

15. The auto-focus image capture device of claim 9, wherein:

the data capture module is configured to obtain sets of digital values corresponding to incident light upon the image sensor;

the comparison module is configured to determine a change in scene values selected from the sets of digital values from one scanning sweep to another scanning sweep;

the indicator module is configured to provide a scene change indication to the control circuit when the change in the scene values indicates that an image scene has changed between the one scanning sweep and the another scanning sweep; and the control circuit is configured to actuate the auto-focus module upon receiving both the image stability indication and the scene change indication.

16. A portable electronic device having an image capture system, the image capture system comprising:

an image capture device having auto-focus capabilities;

a control circuit coupled to the image capture device configured to selectively cause the image capture device to execute an auto-focus operation in the image capture device or cause the image capture device to capture an image;

an image stability mechanism, operable with the control circuit, and configured to provide an image stability indication to the control circuit;

a timer;

wherein the control circuit is at least configured to execute the auto-focus operation upon receiving the image stability indication from the image stability mechanism or, upon on expiration of the timer regardless of whether the image stability indication has been received from the image stability mechanism.

17. The portable electronic device of claim 16, wherein the portable electronic device comprises a mobile telephone.

* * * * *